United States Patent [19]
Oathout

[11] Patent Number: 5,577,946
[45] Date of Patent: Nov. 26, 1996

[54] GAME CALLING DEVICE HAVING ADJUSTABLE PITCH, INTENSITY, TONE AND INFLECTION

[75] Inventor: David E. Oathout, Caroga Lake, N.Y.

[73] Assignee: Legend Lures, Caroga Lake, N.Y.

[21] Appl. No.: 534,321

[22] Filed: Sep. 27, 1995

[51] Int. Cl.[6] .................................................. A63H 5/00
[52] U.S. Cl. ........................ 446/208; 446/207; 446/486
[58] Field of Search ................................. 446/184, 202, 446/206, 207, 208, 209, 416, 486

[56] References Cited

U.S. PATENT DOCUMENTS

| | | |
|---|---|---|
| 2,470,823 | 5/1949 | Luch . |
| 3,020,675 | 2/1962 | Boecker . |
| 3,579,903 | 5/1971 | Stewart . |
| 4,030,241 | 6/1977 | Gallagher . |
| 4,637,154 | 1/1987 | Laubach .................... 446/207 |
| 4,850,925 | 7/1989 | Ady ............................. 446/207 |
| 4,940,451 | 7/1990 | Leady .......................... 446/208 |
| 4,950,201 | 8/1990 | Sceery ......................... 446/208 |

Primary Examiner—Robert A. Hafer
Assistant Examiner—Jeffrey D. Carlson
Attorney, Agent, or Firm—Oliff & Berridge

[57] ABSTRACT

A grunt tube includes a tubular member, a reed and an elastic skin. The tubular member includes a mouthpiece end that allows air to enter, an outlet end that emits sounds and an opening in a wall of the tubular member between the mouthpiece end and the inlet end. The reed vibrates in response to passing air and is disposed within the tubular member adjacent the mouthpiece end and the opening. The elastic skin extends over the wall of the tubular member to at least partially cover the opening. A user can modify sounds emanating from the outlet end produced by air passing through the mouthpiece end and over the reed by selectively applying pressure to the elastic skin. As a result, a varied array of sounds can be produced with the grunt tube.

18 Claims, 2 Drawing Sheets

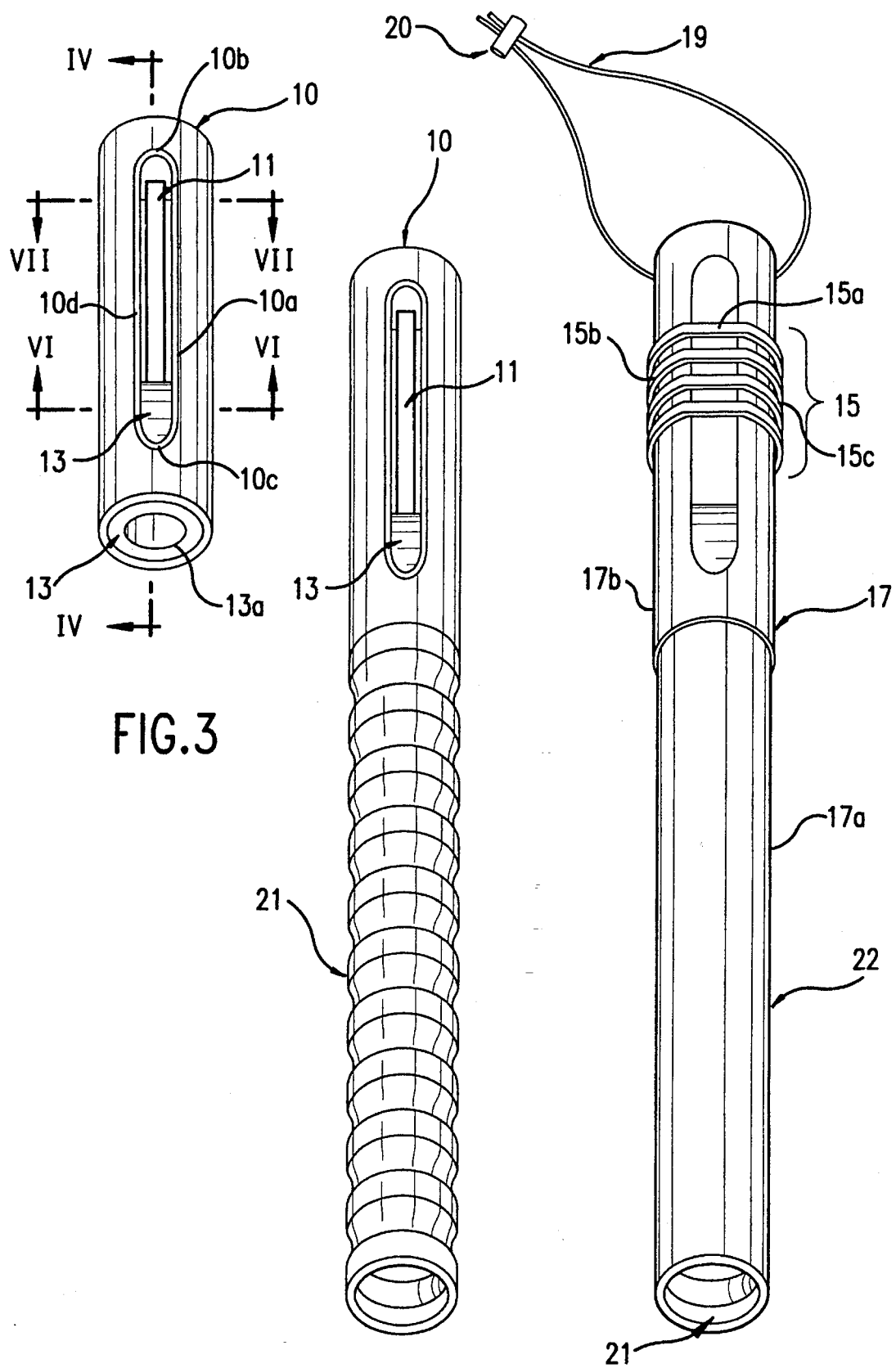

GAME CALLING DEVICE HAVING ADJUSTABLE PITCH, INTENSITY, TONE AND INFLECTION

BACKGROUND OF THE INVENTION

1. Field of the Invention

The present invention relates to game calling devices, and in particular, to an adjustable grunt tube that can produce sounds having varied pitch, intensity, tone and inflection.

2. Description of Related Art

Game calling devices for large mammals and predators are known, In particular, devices known as "grunt tubes" are used to simulate the grunts, snorts, bleats and other sounds produced by white-tailed deer. White-tailed deer sounds are described by Atkenson et al. in "Vocalizations of White-Tailed Deer," 120 The American Midland Naturalist 195 (1988). Hunters and wildlife enthusiasts use grunt tubes to attract deer and other animals.

Grunt tubes generally include a tubular member through which air passes and a reed supported within the tubular member. The passing air excites the reed and causes it to vibrate and to produce sounds. As is known, the sounds produced by a calling device can be varied.

U.S. Pat. No. 3,020,675 to Boecker discloses a goose caller in which the user depresses a pin to contact the reed and control its vibration, thereby changing the pitch of the sounds produced by the goose caller.

U.S. Pat. No. 4,940,451 to Leady discloses an adjustable game call device having a trombone-like tuning member in sliding contact with a single point on a reed that the user positions axially to change the effective length of the reed.

The devices of the prior art, however, fail to provide the user with the capability of varying the inflection of the sounds, as well as their pitch, intensity and tone.

SUMMARY OF THE INVENTION

An object of the invention is provide a grunt tube in which sounds having varied pitch, intensity, tone and inflection can be produced.

Another object of the invention is to provide a grunt tube that can produce varied sounds under any weather conditions.

Still another object of the invention is to provide a grunt tube having a reed that can be manipulated by finger pressure from the user to produce varied sounds.

These and other objects are achieved by the grunt tube of the present invention. The grunt tube includes a tubular member, a reed and an elastic skin. The tubular member includes a mouthpiece end that allows air to enter the tubular member, an outlet end that emits sounds, and an opening in a wall of the tubular member between the mouthpiece end and the inlet end. The reed vibrates in response to passing air and is disposed within the tubular member adjacent the mouthpiece end and the opening. The elastic skin extends over the wall of the tubular member to at least partially cover the opening. A user can modify the sounds emanating from the outlet end that are produced by air passing through the mouthpiece end and past the reed by selectively applying pressure to the elastic skin to contact the reed to change the vibrational characteristics of the reed.

The tubular member preferably includes a mouthpiece connected to a tube, the tube being disposed downstream from the mouthpiece. The mouthpiece preferably includes a plate member having an air channel that extends along a longitudinal axis of the mouthpiece below the reed.

The plate member preferably includes an upstream end disposed adjacent the mouthpiece end. The reed preferably includes an upstream end that is also disposed adjacent the mouthpiece end and a downstream end. The downstream end of the reed is connected to the downstream end of the plate member. The upstream end of the reed is free to vibrate.

The upstream end of the plate member preferably includes an end wall that forms an end of the air channel. The upstream end of the plate member is preferably tapered. The reed is preferably attached to the plate member by a flexible O-ring. The grunt tube preferably includes a reed support member to which the reed and the plate member are attached. The reed support member supports the reed and the plate member such that the reed and the plate member do not contact the wall of the tubular member.

The elastic skin preferably extends to connect the mouthpiece to the tube, as well as to at least partially cover the opening. The opening preferably includes an upstream end, a middle portion and downstream end. The opening preferably widens from the upstream end to the middle portion, and narrows from the middle portion to the downstream end.

The grunt tube preferably includes at least one resilient memory band disposed over the opening outside the elastic skin. The memory band is extended in tension to exert pressure on the elastic skin.

The grunt tube preferably includes a reed chamber within the tubular member. The reed chamber is defined by space between the mouthpiece end, the elastic skin and the outlet end.

BRIEF DESCRIPTION OF THE DRAWINGS

The invention will be described in conjunction with the following drawings in which like reference numerals designate like elements and wherein:

FIG. 1 is a perspective view that illustrates a preferred embodiment of the inventive grunt call, the grunt call including a mouthpiece connected to a tube;

FIG. 2 is a perspective view that illustrates the fully assembled grunt tube having an outer elastic skin extending over the mouthpiece and the tube, memory bands and a lanyard;

FIG. 3 is a perspective view that illustrates the mouthpiece shown in FIG. 1;

DETAILED DESCRIPTION OF PREFERRED EMBODIMENTS

As illustrated in FIG. 1, the grunt tube of the present invention includes a mouthpiece 10 connected to a tube 21.

Figure 4:
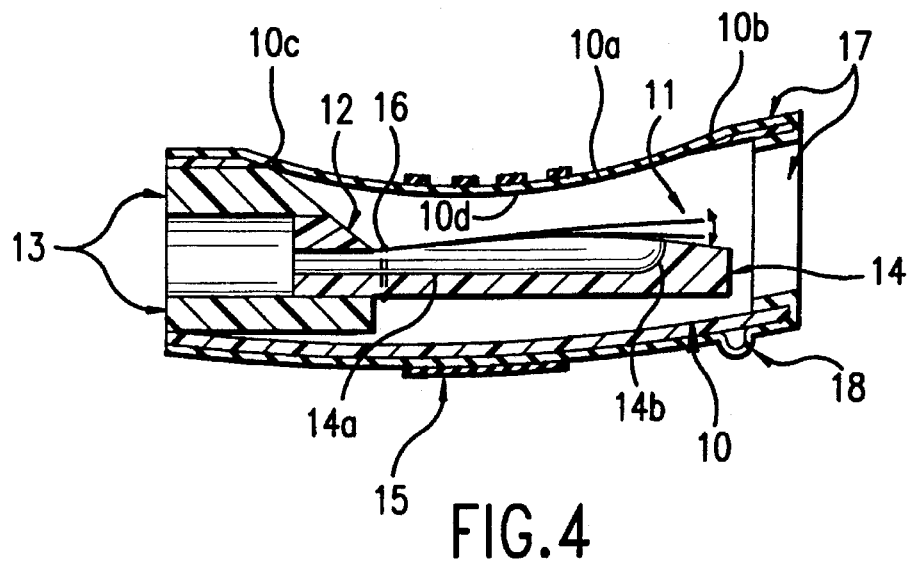
FIG. 4 is a longitudinal cross-sectional view along line IV—IV of the mouthpiece shown in FIG. 3 that illustrates a reed, a reed support member, a wedge and a plate.

As illustrated in FIG. 3, the mouthpiece 10 is a substantially cylindrical tube, preferably formed of plastic, that includes an opening 10a. The opening 10a extends axially, widening from either end 10b, 10c to a middle portion 10d. An axial cross-section of the mouthpiece 10 along a line IV—IV that shows the curved profile of the opening 10a is illustrated in FIG. 4.

The tube 21 (FIGS. 1–2) is approximately the same diameter as the mouthpiece 10. The tube 21 is preferably formed of a flexible material, such as, e.g., corrugated plastic, to facilitate manipulating the tube 21 during use of the grunt call. The tube 21 is dimensioned in length depending upon the operating requirements and desired sound characteristics. The grunt tube can also be used without the tube 21.

A reed 11 is disposed within the mouthpiece 10 in alignment with the opening 10a. The reed is a thin strip of a flexible material, such as, e.g., plastic or MYLAR. As known in the art, the dimensions of the reed and the material of which it is made are determined according to the sound characteristics that the user desires to produce with the grunt call. In the illustrated embodiment, the reed 11 extends substantially the length of the opening 10a.

Figure 5:
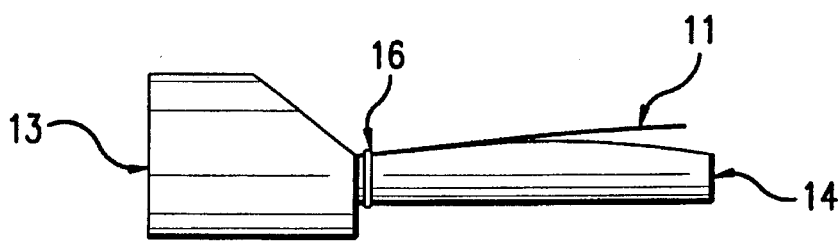
FIG. 5 is a side view of the reed support member, plate and reed of FIG. 4.
Figures 6, 7:
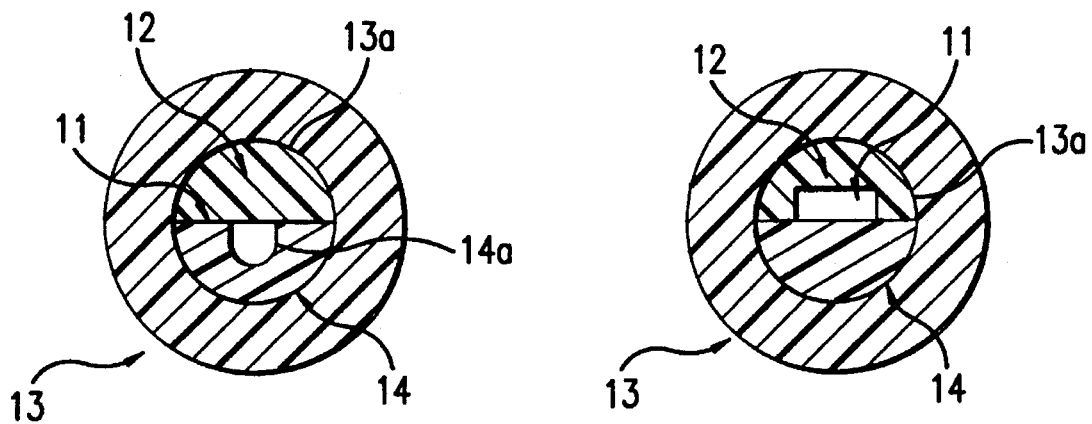
FIG. 6 is a transverse cross-sectional view along line VI—VI of the mouthpiece shown in FIG. 3 that illustrates the reed support member, the reed, the plate and the wedge as assembled.
FIG. 7 is a transverse cross-sectional view along line VII—VII of the mouthpiece shown in FIG. 3 that illustrates the reed support member, the reed, the plate and the wedge as assembled.

The reed 11 is supported by a plate 14 (FIGS. 4–5) and the reed 11 and plate 14 are secured to a reed support member 13 by a wedge 12. In the illustrated embodiment, the length of the plate is at least as great as the length of the reed. Depending upon the desired sound characteristics, however, different plate configurations can be used. FIGS. 6 and 7 illustrate transverse cross-sections along lines VI—VI and VII—VII, respectively, of the reed 11, plate 14, reed support member 13 and wedge 12.

In the illustrated embodiment, the plate 14 has a substantially semicircular cross-section. An upper side of the plate 14 is flat and includes a groove 14a through which air is conveyed by the user. The groove 14a extends through a front (i.e., downstream) surface of the plate 14 and terminates at a groove end wall 14b near a rearward (i.e., upstream) portion of the plate 14. As shown in FIG. 5, the rearward end of the plate is tapered to have a reduced profile to allow the reed 11 to vibrate freely. Similarly, the forward end of the plate has a reduced profile such that the plate 14 can be inserted in the reed support member 13.

The reed support member 13 is substantially cylindrical and dimensioned to fit snugly within the mouthpiece 10. As assembled, a Forward face of the reed support member 13 is flush with a Forward (i.e., downstream) end of the mouthpiece 10. The reed support member includes a bore 13a shaped to receive the plate 14, reed 11 and wedge 12. A rearward (i.e., upstream) portion of the reed support member 13 is chamfered so that the reed support member does not project above the sides of the opening 10a (see FIG. 4).

The reed 11 is secured by aligning it over the upper side of the plate 14 and positioning a flexible O-ring 16 over one end of the reed 11 and the Forward end of the plate 14. The reed 11 and the plate 14 are then inserted into the bore 13a of the reed support member 13. The wedge 12 is shaped to frictionally engage a remaining open portion of the bore 13a to secure the plate 14 and the reed 11. The reed support member 13 and wedge 12 may be separate members, with one or both formed of plastic. In an alternative embodiment, the reed support member 13 and the wedge 12 are formed as a single piece (preferably of plastic), and the reed 11 and the plate 14 are shaped to frictionally engage a remaining open portion of the bore 13a. In either embodiment, a forward end of the wedge 12 is chamfered similar to the forward end of the reed support member 13.

During use, air exhaled by the user is directed through the mouthpiece 10 into the groove 14a near the groove 11 before traveling downstream in the groove within the plate between the reed support member 13 and the wedge 12 As described below, the reed 11 can be moved axially and laterally while it is secured in the reed support member 13 by the plate 14 and the wedge 12.

At least a portion of the grunt tube is covered by an elastic skin 17 (FIG. 2) that is stretched to cover the mouthpiece 10 and the tube 21. In a preferred embodiment, the elastic skin 17 is made of synthetic or natural rubber and serves to flexibly connect the mouthpiece 10 to the tube 21. The rubber material has a non-reflective matte black finish. In addition to reducing reflections, the rubber material also minimizes any sounds produced by incidental contact between the grunt call and other objects, such as, e.g., a hunter's weapon.

The elastic skin extends over the rear end of and into the mouthpiece 10. As a result, the relatively softer elastic skin material, rather than the mouthpiece itself, contacts the mouth of the user during operation of the deer call. In addition, the portion of the elastic skin within the mouthpiece 10 can be extended beyond the extent shown in FIG. 4 to prevent the reed 11 from contacting the relatively hard material of the mouthpiece 10, which would produce harsh and unnatural sounds.

Preferably, the elastic skin 17 includes a forward portion 17a and a separate rear portion 17b as shown in FIG. 2. Although the elastic skin 17 fits tightly around the mouthpiece 10 and the tube 21, the elastic skin 17 can be rolled back over itself at its ends to expose the rear end of the mouthpiece 10 or the opening 10a, or to disconnect the mouthpiece 10 from the tube 21.

As shown in FIG. 2, memory bands 15 are disposed over the elastic skin 17 in an area over the opening 10a (i.e., the cover portion). The memory bands 15 may be formed individually, or, as in a preferred embodiment, as a single piece having a portion with multiple segments. The memory bands 15 are formed of an elastic material, preferably rubber. As discussed below in further detail, the memory bands can be individually spaced to designate predetermined points on the elastic skin 17.

A lanyard 20 is attached to the grunt tube to carry the deer call in a position readily accessible to the user, e.g., around the user's neck. A clasp 20 allows the length of the lanyard 19 to be adjusted. The lanyard is held against the tube by the elastic skin. Thus, in a preferred embodiment, the lanyard is designed to break or to tear away if it becomes entangled, e.g., if the user falls. As a result, the lanyard does not pose a potential safety hazard to users.

In operation, the rear end of the mouthpiece is positioned against the mouth of the user, and the user exhales to produce a call. The exhaled air from the user into and through the groove 14a before travelling through the bore 13a of the reed support member 13 and is directed though the groove 14a. As the moving air travels through the groove rearward of the O-ring 16, the air excites the reed 11. The reed 11 vibrates and produces sounds that travel towards and exit the outlet end of the tube 21. The elastic skin 17 surrounding the mouthpiece 10 and the tube 21 is air-tight and ensures that substantially all of the exhaled air travels through the mouthpiece 10, over the reed 11 and out the outlet end without leakage.

The sounds produced by the grunt call can be varied in several ways. First, the user can partially or completely cover the forward end of the tube 21 and/or change the length of the tube 21 to change the pitch. Second, the user can invert the grunt call and produce different sounds by inhaling through the forward end of the tube 21 instead of exhaling through the rear end of the mouthpiece 10. Alternatively, the user can reverse the direction of reed support member 13/reed 11/wedge 12 assembly.

Third, the user can adjust the position of the reed 11. At any given reed starting position (as determined by the length of the reed 11 extending rearward of the O-ring 16), the user can adjust the effective length of the reed 11, i.e., the point at which the reed 11 contacts the plate 14. The effective length is adjusted by manipulating the reed with finger pressure applied through the elastic skin 17 in the area over the opening 10a. During operation, the user can selectively depress the elastic skin 17 and the reed 11 at different points sequentially or simultaneously along a longitudinal axis of the reed 11 to change its effective length. Subtle changes can be produced by contacting the reed 11 at different points along its transverse axis. The widening of the middle portion of the opening permits increased access to the transverse areas of the reed. Upon releasing the finger pressure, the reed 11 returns to its starting position.

Alternatively, the starting position of the reed 11 can be changed by peeling back the elastic skin 17 from the rear end of the mouthpiece 10 to expose the opening 10 and to allow the user to access the reed 11. The axial position of the O-ring on the plate 14 can then be adjusted through the opening 10 to change the vibrational length of the reed. However, it is noted that the elastic skin provides sufficient friction to allow the position of the reed 11 and/or the O-ring 16 to be changed without disassembling the grunt tube. Therefore, the user can insert a finger into the mouthpiece to manipulate the O-ring and change its position without peeling back the elastic skin. Also, the reed 11 can be inserted axially further into or withdrawn further from the reed support member 13 thereby changing the relative axial position of the reed within the mouthpiece. In addition, the reed can be bent to produce sounds having particular characteristics. As a result, the tone, pitch, intensity and inflection of the sounds produced with the grunt tube can be varied.

In the normal configuration of the grunt call as illustrated, the reed is disposed to be approximately horizontal. Alternatively, the grunt call can be assembled in a rotated configuration in which the reed is disposed vertically such that the opening faces towards one side (left or right), rather than towards the top. The rotated configuration permits easier manipulation of the reed for some users.

The memory bands 15 can be disposed at predetermined points corresponding to different effective lengths of the reed 11. The memory bands serve as reference points for users desiring to reproduce the same sound at a later time or to produce a different sound relative to a reference sound. If the reference sound is the sound produced when the user exhales while depressing the elastic skin 17 and the reed 11 at a point corresponding to a second memory band 15b, the user depresses a first memory band 15a to produce a higher pitched sound. Correspondingly, the user depresses a third memory band 15c to produce a lower pitched sound. The user can also produce intermediate sounds by depressing the spaces on the cover portion between the memory bands 15. The distinct feel of the memory bands 15 relative to the surrounding elastic skin permits the user to locate any one of the memory bands and to produce a desired sound, even in low light conditions.

The memory bands 15 exert pressure on the cover portion of the elastic skin 17. As a result, the memory bands 15 reduce vibrations in the cover portion. For some applications, however, the memory bands are removed and the cover portion vibrate freely. The cover portion then vibrates similar to a loudspeaker diaphragm and enhances the sound. If desired, the user can dampen these vibrations by applying finger pressure to various points along the cover portion.

Unlike the devices of the prior art, the only elements of the grunt call of the present invention that move during operation are the reed 11 and the cover portion of the elastic skin 17. As a result, the grunt call is not subject to freezing and thus does not become inoperable during use in adverse weather conditions.

While this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. A grunt tube comprising:

a tubular member defining an axial direction and having a mouthpiece end that allows air to enter said tubular member, an outlet end that emits sounds and an opening in a wall of said tubular member between said mouthpiece end and said outlet end;

a reed that vibrates in response to passing air, said reed being disposed within said tubular member adjacent said mouthpiece end and said opening and having portions along the axial direction simultaneously accessible through said opening;

an elastic skin extending over said wall of said tubular member to at least partially cover said opening, the elastic skin being resilient to allow selective application of pressure through the elastic skin to at least one of the simultaneously accessible portions on said reed, wherein a user can modify sounds emanating from said outlet end produced by air passing through said mouthpiece end and past said reed by selectively applying pressure to said elastic skin.

2. The grunt tube of claim 1, wherein said tubular member includes a mouthpiece and a tube connected to a downstream end of said mouthpiece, wherein said reed is connected to and disposed within said mouthpiece.

3. The grunt tube of claim 2, wherein said elastic skin connects said mouthpiece to said tube.

4. The grunt tube of claim 2, wherein said mouthpiece includes a plate member having an air channel extending in the axial direction below said reed.

5. The grunt tube of claim 4, wherein one end of said reed is connected to said plate member and an opposite end of said reed is free to vibrate.

6. The grunt tube of claim 4, wherein said air channel terminates at an upstream end delimited by a end wall of said plate member that directs air towards said reed.

7. The grunt tube of claim 4, wherein said plate member is tapered in the axial direction.

8. The grunt tube of claim 4, wherein said mouthpiece includes a reed support member for supporting said reed and said plate member for selective axial positioning in the axial direction within the mouthpiece.

9. The grunt tube of claim 4, wherein said reed is attached to said plate member by a flexible O-ring.

10. The grunt tube of claim 1, wherein said opening includes an upstream portion, a middle portion and downstream portion, and wherein said middle portion is wider than said upstream portion and downstream portion.

11. The grunt tube of claim 1, further comprising at least one resilient memory band disposed over said opening outside said elastic skin, said memory band being extended in tension to exert pressure on said elastic skin.

12. A game calling device comprising:

a tubular member having a mouthpiece end, an outlet end and an opening in a wall of the tubular member between the mouthpiece and outlet ends;

a reed supported in the tubular member adjacent the opening, the reed being supported on a plate and having a fixed end and a vibrational length with portions simultaneously accessible through said opening from the fixed end and vibrating in response to air passing through the tubular member; and an elastic skin extending over the tubular member and covering the opening to allow selective application of varying pressures through the elastic skin to at least one of the simultaneously accessible portions of the reed to change the vibrational length of the reed.

13. The game calling device of claim 12, further comprising an axially movable support for changing an axial position of the reed relative to the opening.

14. The game calling device of claim 12, further comprising an axially movable support for changing an axial position of the fixed end of the reed relative to the plate.

15. The game calling device of claim 12, wherein the reed has a central longitudinal axis extending in an axial direction of the tubular member, and the opening includes an upstream portion and downstream portion, each having a width in a transverse direction of the tube narrower than a width of a central portion of the tube, the opening allowing pressure to be applied to transverse portions of the reed on opposite sides of a central longitudinal axis of the reed.

16. A method of varying sounds produced by a reed within a grunt tube, the grunt tube having a tubular member with a mouthpiece end, an outlet end and an opening between the mouthpiece end and the outlet end for providing simultaneous access to multiple portions of said reed, and an elastic skin that extends over said tubular member to at least partially cover the opening, said method comprising:

conveying air through said mouthpiece end and past said reed, thereby causing said reed to vibrate and to produce sounds that emanate from said outlet end; and selectively applying at least one pressure to at least one of the simultaneously accessible multiple portions of said reed through at least one point on said elastic skin to modify said sounds.

17. The method of claim 16, wherein said step of selectively applying at least one pressure includes contacting said reed through said elastic skin with finger pressure at multiple points along a longitudinal axis of said reed.

18. The method of claim 16, wherein said step of selectively applying at least one pressure includes contacting said reed through said elastic skin with finger pressure at multiple points along a transverse axis of said reed.

* * * * *